(12) United States Patent
Meyers

(10) Patent No.: US 6,697,463 B1
(45) Date of Patent: Feb. 24, 2004

(54) SYSTEM FOR PROVIDING INCREASED DATA SPEED USING HIGH RESOLUTION ANALOG TO DIGITAL CONVERSION

(75) Inventor: Thomas G. Meyers, Fremont, CA (US)

(73) Assignee: GoDigital Networks Corporation, Fremont, CA (US)

( * ) Notice: Subject to any disclaimer, the term of this patent is extended or adjusted under 35 U.S.C. 154(b) by 0 days.

(21) Appl. No.: 09/510,419

(22) Filed: Feb. 22, 2000

Related U.S. Application Data

(60) Provisional application No. 60/121,009, filed on Feb. 22, 1999.

(51) Int. Cl.[7] .............................................. H04M 11/00
(52) U.S. Cl. ................................ 379/93.05; 379/93.06; 379/93.08
(58) Field of Search .......................... 379/90.01, 93.05, 379/93.06, 93.07, 93.08, 93.28, 242; 370/250, 458; 375/222, 242

(56) References Cited

U.S. PATENT DOCUMENTS

| | | | |
|---|---|---|---|
| 6,052,412 A | | 4/2000 | Ruether et al. |
| 6,141,403 A | * | 10/2000 | Dillion et al. ........... 379/93.05 |
| 6,151,364 A | | 11/2000 | Ruether et al. |
| 6,208,670 B1 | * | 3/2001 | Milliron et al. ............. 370/540 |
| 6,546,024 B1 | * | 4/2003 | Sharper et al. ............. 370/470 |

* cited by examiner

*Primary Examiner*—Melur Ramakrishnaiah
(74) *Attorney, Agent, or Firm*—Sierra Patent Group, Ltd.

(57) ABSTRACT

Method and apparatus for transmitting encoded data and/or voice signals with increased data speed in a communications system using high resolution analog to digital and digital to analog conversions to attain transmission rates higher than 33.6 Kb/s rate limit of V.90 modem is provided.

42 Claims, 5 Drawing Sheets

SYSTEM FOR PROVIDING INCREASED DATA SPEED USING HIGH RESOLUTION ANALOG TO DIGITAL CONVERSION

PRIORITY CLAIM UNDER 35 USC §119

This application claims priority to provisional patent application No. 60/121,009 filed Feb. 22, 1999 under 35 USC §119.

BACKGROUND OF THE INVENTION

1. Field of the Invention

The present invention is related to a system for providing increased data speed using high resolution analog to digital conversion for use in communication systems. In particular, the present invention relates to method and apparatus for increasing pulse amplitude modulated (PAM) data transmission speed in communications systems such as pair gain systems by increasing the bandwidth allocated to each subscriber.

2. Description of the Related Art

The presently available 56K modems achieve their high transmission speeds by training the analog to digital (A/D) conversion process which takes place in the transmission path between the central office unit and the remote terminal unit, or between the customer site unit and the Internet Service Provider (ISP). The higher resolution gained by the A/D converter is maintained at the terminal end of the pair gain system by a D/A converter of the same resolution.

However, the transmission speed obtained by the 56K modems is significantly reduced when an additional A/D conversion process is introduced into the data transmission path. This degradation in speed is caused by the quantization noise of the additional A/D conversion. The quantization noise of an A/D converter is a function of the resolution of the A/D conversion process. In turn, the resolution of the A/D conversion process is governed by the number of bits associated with each sample. The A/D converter used in typical telephony systems is an 8-bit companded converter, companding referring to non-linear conversion characteristics of the A/D converter.

In a pair gain system, the additional A/D converter added in the transmission path is under the control of the pair gain system supplier. Moreover, the A/D converter in a pair gain system does not need to be an 8-bit companded type as generally used in the typical telephony systems. In fact, the A/D converter in a pair gain system can have a greater number of bits associated with each sample than the typical 8 bits. These extra bits tend to decrease the quantization noise and increase the attainable modem data transmission rates. However, since a greater number of bits must be carried over the pair gain system, the number of available subscribers in the pair gain system is reduced.

FIG. 1 illustrates an eight line copper fed subscriber carrier system available from GoDigital Networks Corp. of Fremont Calif., the assignee of the present invention, a detailed description of which is provided in an application entitled Multiple Digital Subscriber Carrier With Drop and Insert Repeater System concurrently filed herein which claims priority under 35 USC §119 to provisional application No. 60/121,011 filed on Feb. 22, 1999, the disclosures of each of which are incorporated in its entirety herein by reference.

As shown, Central Office Unit 101 is provided with eight Subscriber Line Access Circuits (SLACx) 104, each of which is configured to emulate telephone line termination. Also shown in FIG. 1 is Customer Site Unit 102 which, in this embodiment, is provided with eight Subscriber Line Interface Circuits (SLICx) 109, each of which is coupled to a subscriber line and configured to emulate the Central Office. The Central Office Unit 101 is coupled to the Customer Site Unit 102 via a single, bi-directional twisted copper cable pair 103. As further shown in FIG. 1, the Central Office Unit 101 and the Customer Site Unit 102 are each provided with eight 8-bit codecs 105, 108 each of which are respectively coupled to corresponding the SLAC 104 in the Central Office Unit 101, and to the corresponding SLIC 109 in the Customer Site Unit 102. Further provided are bi-directional data transmission buses which carry digital data bits from each of the 8-bit codecs 105, 108 in the Central Office Unit 101 and the Customer Site Unit 102, respectively, to control units such as framing and transport units 106, 107 which are coupled to the single twisted pair 103.

The 8-bit codecs 104 in the Central Office Unit 101 are configured to encode the analog data received from the Central Office switch (not shown) into a corresponding digital bit stream format, while the 8-bit codecs 108 in the Customer Site Unit 102 are configured to decode the digital bit stream received from the central Office Unit 101 via the single twisted cable pair 103 into the respective analog format. Accordingly, the analog signals received from the Central Office switch are transported to the remote site at the Customer Site Unit 102 such that the subscribers connected to the subscriber lines are able to receive the transmitted analog signals (and to transmit signals in the opposite direction to the Central Office Unit 101 via the same mechanism as described above). For example, a subscriber line may be connected to the Customer Site Unit 102 via a 56 Kb/s modem for signal transmission and reception.

FIG. 2 illustrates the framing and transport unit 106 in the 8-bit system of FIG. 1 in further detail. As shown, there is provided a framer 203 for assigning time slots to each 8-bit codecs in the Central Office Unit 101 and the Customer Site Unit 102, and also for controlling the signaling. By way of example, at the central office side, the signaling information may consist of off-hook, and ring detect while at the subscriber side, the signaling information may consist of ringing and off hook detection. This signaling information is added to the data bit stream such that the data rate at the transmission line consists of the codec data plus the signaling data. An additional 32 KHz may be allocated for signaling. With a given clock for the system, FIG. 2 shows, for example, timing chart for two time slots and the transmit data TX and receive data RX for the given time slots.

Further shown in FIG. 2 is a microprocessor 202 coupled to the framer 203 and transceiver 201 (for example, a DSP chip such as Brooktree BT 8960) for controlling and processing the operation of the framer 203 and the transceiver 201. The transceiver 201 is a transport chip configured for transmitting digital data stream from the 8-bit codecs 105 in the Central Office Unit 101 with the signaling data to a similar transceiver located at the Customer Site Unit 102 (FIG. 1) and vice versa.

In the subscriber carrier system shown in FIGS. 1 and 2, an extra A/D conversion process is required in the downstream path towards the subscribers in the Central Office Unit 101. If, for example, the subscriber is connected to the Customer Site Unit 102 via a 56 Kb/s modem, this extra A/D conversion required in the system described above reduces the subscriber modem speed by approximately 30% over the speed that could otherwise be achievable (without the additional A/D conversion process) such that the signal transmission rate is limited to 33.6 Kb/s. Therefore, it would be desirable to have a signal transmission system which minimizes the reduction of the signal transmission rate such that the subscribers are able to receive information at a higher data rate then currently available.

SUMMARY OF THE INVENTION

In view of the foregoing, there are provided method and apparatus for providing a system for increasing pulse amplitude modulated (PAM) data transmission speed in communication systems such as pair gain systems by increasing the bandwidth allocated to each subscriber. In particular, in accordance with the present invention, data transmission speed in communication systems are substantially increased by the higher resolution A/D and D/A conversion processes of the present invention to mimic the companded conversion process of the existing 8-bit telephony type codecs.

In accordance with one embodiment of the present invention, there is provided a high speed data transmission system, comprising: a data transmission line; a central office unit coupled to the data transmission line for receiving analog signals from a central office switch and for receiving digital signals from the data transmission line, the central office unit including: a plurality of subscriber line access circuits each configured to interface with a central office switch; a first plurality of codecs coupled to a respective one of the subscriber line access circuits, each of said first plurality of codecs configured to receive analog signals from the central office switch via the respective subscriber line access circuits and to convert the analog signals to corresponding digital signals; a first data bus coupled to each of the first plurality of codecs for transporting the digital signals; and a first controller coupled to the first data bus configured to receive the digital signals via the first data bus for transmission to the data transmission line; and a customer site unit coupled to the data transmission line for receiving analog signals from one or more subscriber terminals and for receiving digital signals from the transmission line, the customer site unit including: a plurality of subscriber line interface circuits each configured to interface with a one or more subscriber terminals; a second plurality of codecs coupled to a respective one of the plurality of subscriber line interface circuits to receive analog signals and to convert the analog signals to corresponding digital signals; a second data bus coupled to each of the second plurality of codecs for transporting the digital signals; and a second controller coupled to the second data bus configured to receive the digital signals from the second plurality of codecs via the data bus for transmission to the data transmission line.

In accordance with another embodiment of the present invention, there is provided a central office unit, comprising: a plurality of subscriber line access circuits each configured to interface with a central office switch; a plurality of codecs coupled to a respective one of the plurality of subscriber line access circuits, each of said codecs configured to receive analog signals from the central office switch via the respective subscriber line access circuits and to convert the analog signals to corresponding digital signals; a data bus coupled to each of the codecs for transporting the digital signals; and a controller coupled to the data bus configured to receive the digital signals via the data bus for transmission to a transmission line.

In accordance with yet another embodiment of the present invention, there is provided a customer site unit, comprising: a plurality of subscriber line interface circuits each configured to interface with a one or more subscriber terminals; a plurality of codecs coupled to a respective one of the plurality of subscriber line interface circuits to receive analog signals and to convert the analog signals to corresponding digital signals; a data bus coupled to each of the codecs for transporting the digital signals; and a controller coupled to the data bus configured to receive the digital signals from the plurality of codecs via the data bus for transmission to a transmission line.

In accordance with a further embodiment of the present invention, there is provided a high speed data transmission method, comprising the steps of: providing a data transmission line; installing a central office unit for connection to the data transmission line for receiving analog signals from a central office switch and for receiving digital signals from the data transmission line, the step of installing the central office unit including the steps of: configuring a plurality of subscriber line access circuits for interface with a central office switch; providing a first plurality of codecs coupled to a respective one of the subscriber line access circuits, each of said first plurality of codecs configured to receive analog signals from the central office switch via the respective subscriber line access circuits and to convert the analog signals to corresponding digital signals; providing a first data bus coupled to each of the first plurality of codecs for transporting the digital signals; and providing a first controller to the first data bus configured to receive the digital signals via the first data bus for transmission to the data transmission line; and installing a customer site unit for connection to the data transmission line for receiving analog signals from one or more subscriber terminals and for receiving digital signals from the transmission line, the step of installing the customer site unit including the steps of: configuring a plurality of subscriber line interface circuits for interface with a one or more subscriber terminals; providing a second plurality of codecs coupled to a respective one of the plurality of subscriber line interface circuits to receive analog signals and to convert the analog signals to corresponding digital signals; providing a second data bus coupled to each of the second plurality of codecs for transporting the digital signals; and providing a second controller coupled to the second data bus configured to receive the digital signals from the second plurality of codecs via the data bus for transmission to the data transmission line.

In accordance with still a further embodiment of the present invention, there is provided a method of installing a central office unit in a communication system, comprising the steps of: providing a plurality of subscriber line access circuits each configured to interface with a central office switch; providing a plurality of codecs coupled to a respective one of the plurality of subscriber line access circuits, each of said codecs configured to receive analog signals from the central office switch via the respective subscriber line access circuits and to convert the analog signals to corresponding digital signals; providing a data bus coupled to each of the codecs for transporting the digital signals; and providing a controller coupled to the data bus configured to receive the digital signals via the data bus for transmission to a transmission line.

In accordance with yet still a further embodiment of the present invention, there is provided a method of installing customer site unit in a communication system, comprising the steps of: providing a plurality of subscriber line interface circuits each configured to interface with a one or more subscriber terminals; providing a plurality of codecs coupled to a respective one of the plurality of subscriber line interface circuits to receive analog signals and to convert the analog signals to corresponding digital signals; providing a data bus coupled to each of the codecs for transporting the digital signals; and providing a controller coupled to the data bus configured to receive the digital signals from the plurality of codecs via the data bus for transmission to a transmission line.

These and other features and advantages of the present invention will be understood upon consideration of the following detailed description of the invention and the accompanying drawings.

DESCRIPTION OF THE PREFERRED EMBODIMENT

Figure 1:
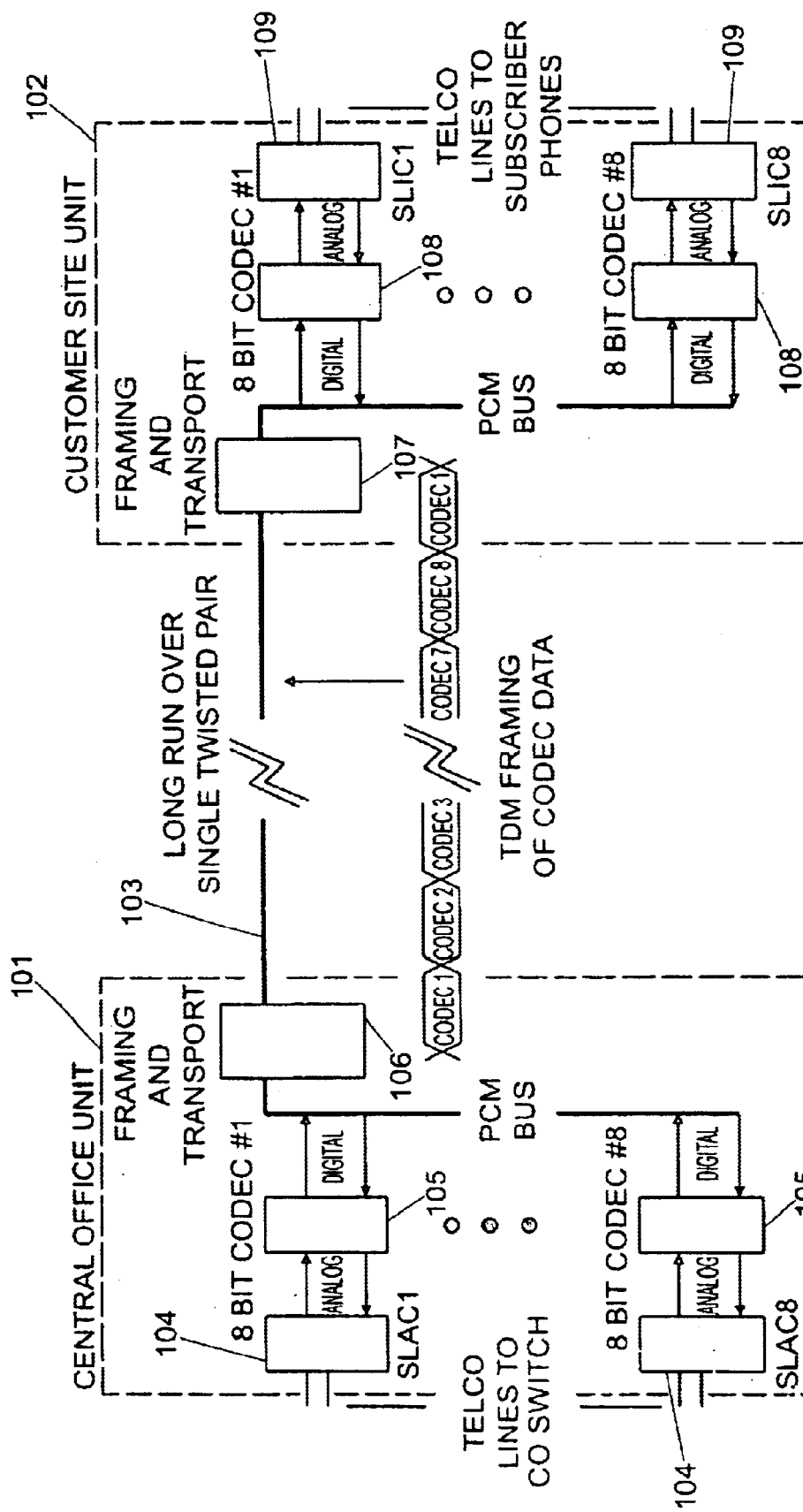
FIG. 1 illustrates an eight line copper fed subscriber carrier system.
Figure 3:
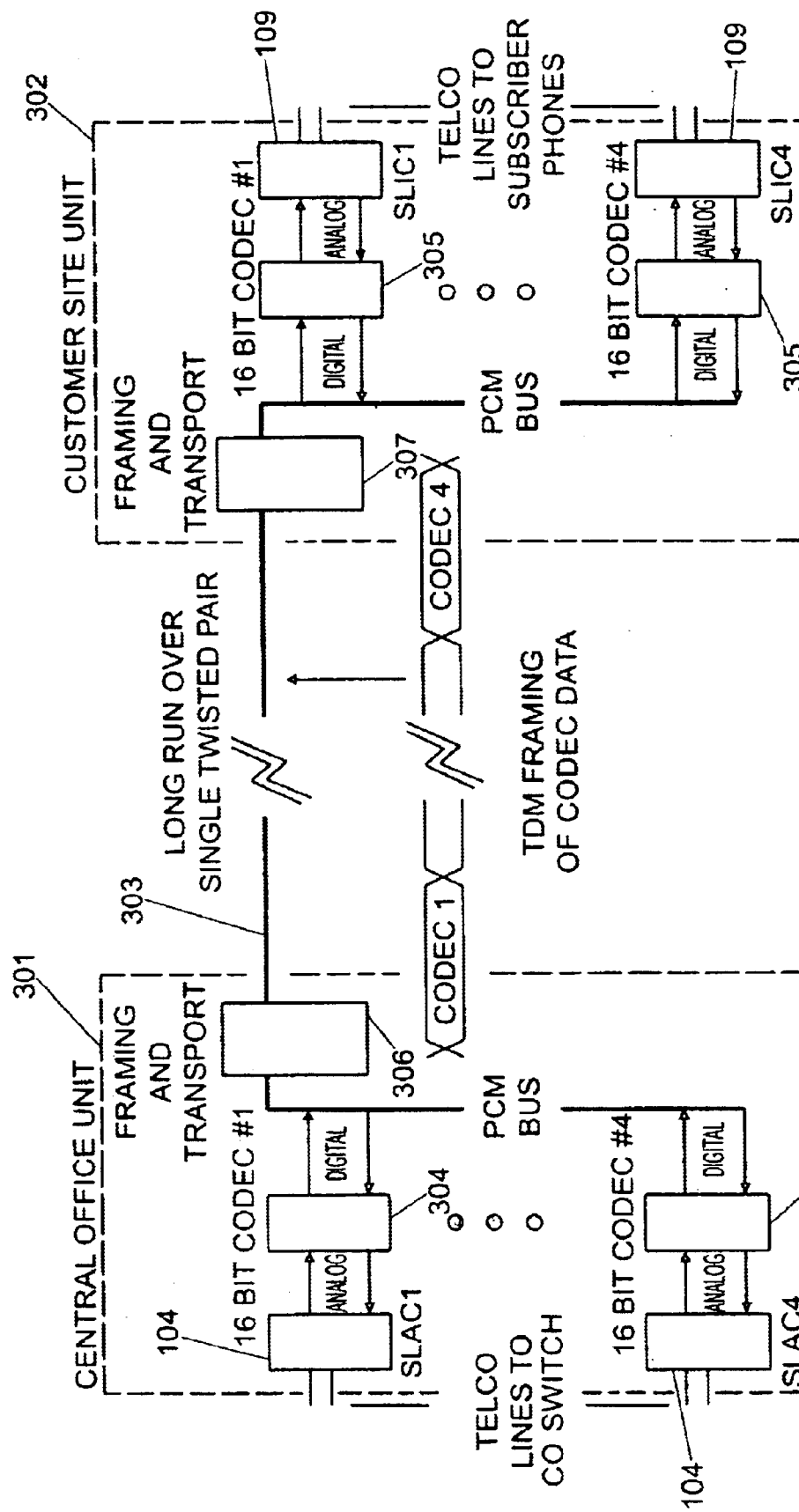
FIG. 3 illustrates a system for providing increased data speed using high resolution analog to digital and digital to analog conversions in accordance with one embodiment of the present invention.

FIG. 3 illustrates a system for providing increased data speed using high resolution analog to digital conversion in accordance with one embodiment of the present invention. Like parts that operate in a similar manner as in the system shown in FIG. 1 are labeled as such, and their operations are not described here in detail.

As shown, the embodiment of FIG. 3 is provided with a plurality of 16-bit codecs 304 in the Central Office Unit 301, while the Customer Site Unit 302 is provided with 16-bit codecs 305 to encode and decode, respectively, 16 bit data. A control unit such as framing and transport units 306, 307 provided at, the Central Office Unit 301 and the Customer Site Unit 302, respectively, are modified accordingly (as discussed further below) to provide the transmission of the higher resolution digital data bit stream to and from the 16-bit codecs 304, 305. Further, similar to the system shown in FIG. 1, each of the 16-bit codecs 304 in the Central Office Unit 301 are coupled to the framing and transport unit 306 by a bi-directional PCM data bus, and likewise, each of the 16-bit codecs 305 in the Customer Site Unit 302 are coupled to the corresponding framing and transport unit 307 by another bi-directional PCM data bus.

In this manner, a higher data transmission rate can be achieved between the Central Office Unit 301 and the Customer Site Unit 302 using existing 56 Kbps modems. The data transmission rate can be increased beyond the 33.6 Kbps limit resulting in faster data download and upload times from user terminals (such as personal computers or PDAs—not shown) coupled to the Customer Site Unit 302. With the increased data transmission rate system as described above, the number of available channels is reduced. Compared to the system shown in FIG. 1 which is configured as an eight channel system, in the embodiment of the present invention shown in FIG. 3, only four channels are available. However, as most channels remain idle most of the time (with varying degree of use in data download and upload from connected users), the four channel system of the present invention provides sufficient bandwidth to accommodate the existing demand (as with the eight channel system shown in FIG. 1), but with a higher data transmission rate since higher resolution conversion process (in the Central Office Unit 301 and the Customer Site Unit 302) permits a higher modem data transmission rates.

While the embodiment shown in FIG. 3 uses 16 bits allocated per subscriber, in practice, fewer bits may be sufficient to achieve the higher rate data transmission, for example, at 12 or 14 bits. In such a case, the resolution of the A/D and D/A conversion likewise need not be as high as 16 bits as shown in FIG. 3. For example, a 12-bit system using 12-bit codecs could carry six subscribers instead of eight without increasing the digital data rate over the twisted pair 303. Alternatively, in accordance with another embodiment of the present invention, a higher data rate (for example, a two-fold increase) can be carried over the twisted cable pair 303 between the Central Office Unit 301 and the Customer Site Unit 302 with the number of transmission channels remaining at eight.

Figure 4:
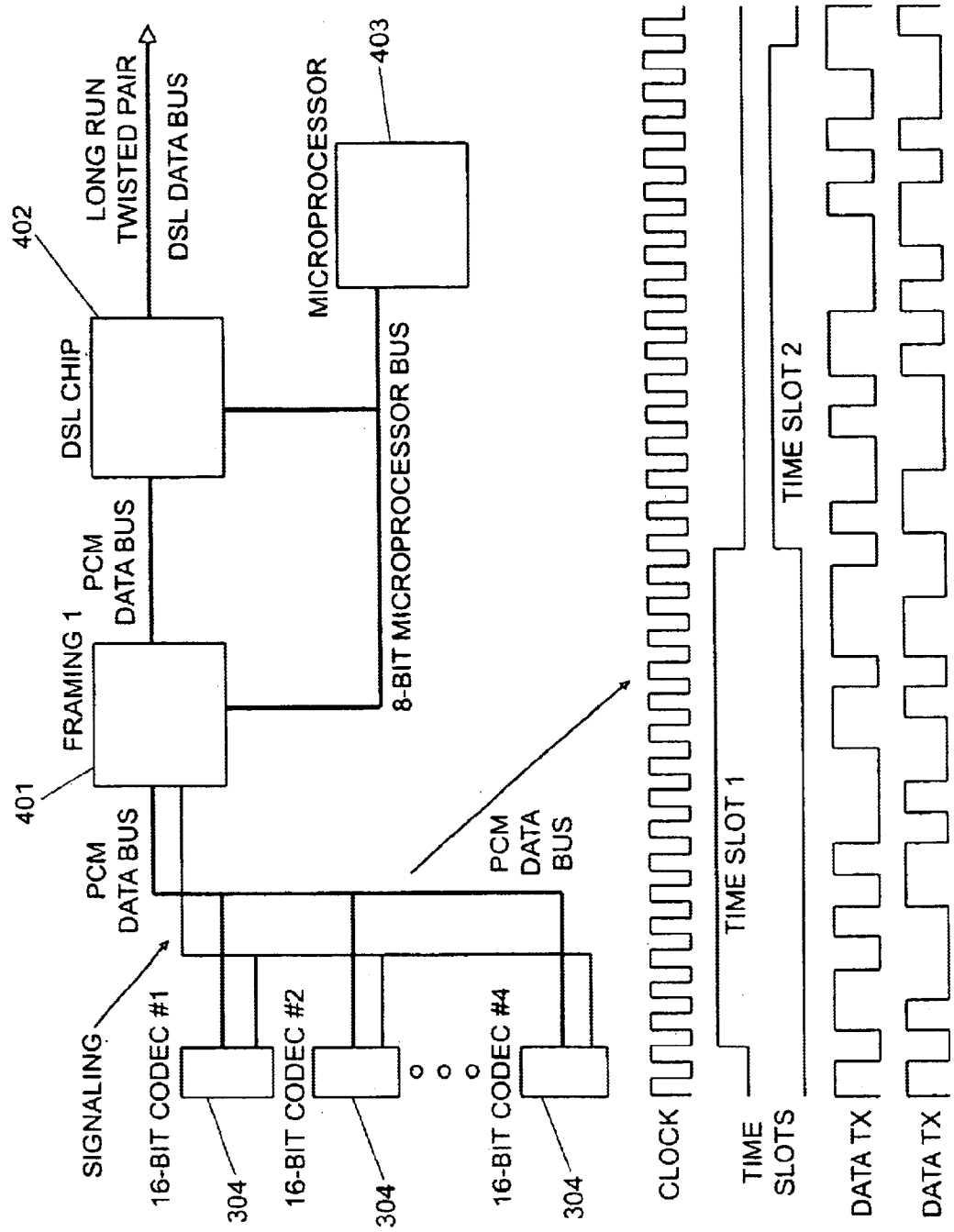
FIG. 4 illustrates the framing and transport mechanism for the system for providing increased data speed using high resolution analog to digital and digital to analog conversions in accordance with one embodiment of the present invention.

FIG. 4 illustrates the framing and transport unit 306, 307 of the system shown in FIG. 3 in accordance with one embodiment of the present invention in further detail. In particular, FIG. 4 shows the framing and transport unit for the 16-bit codecs 304, 305 in the signal transmission path in accordance with the present invention. As shown, framer 401 uses four 16-bit time slots such that if the data link over the twisted cable pair 303 is increased by twofold, then the eight 16-bit time slots can be accommodated. The transceiver 402 (DSL chip) is configured to transmit and receive the 16 bit data stream in accordance with the framing signals from the framer 401 via the PCM data bus therebetween, and the control signals from the microprocessor 403 configured to control and process the data transmission in the framer 401 and the transceiver 402.

Figure 2:
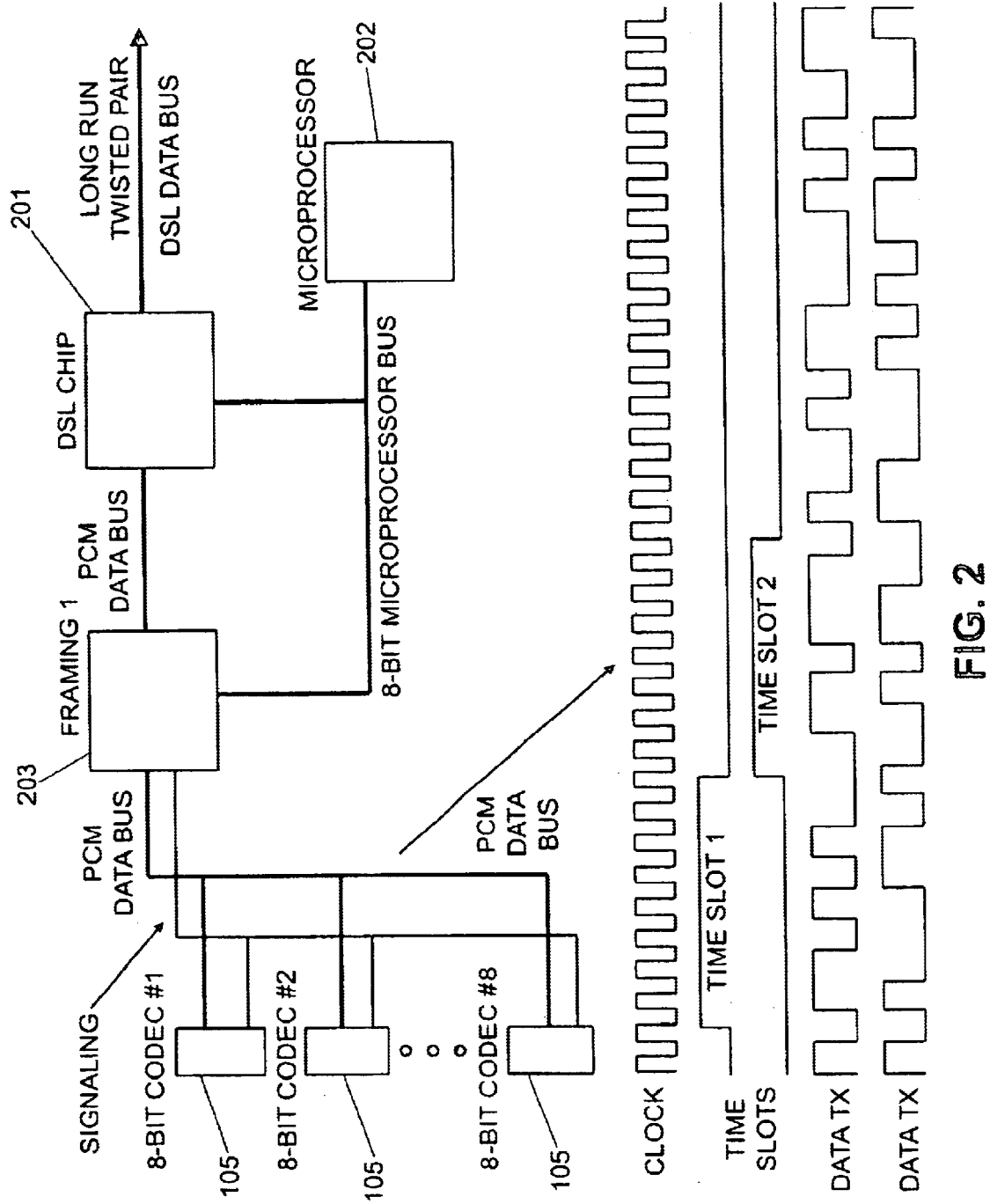
FIG. 2 illustrates the framing and transport mechanism for the eight line copper fed subscriber carrier system shown in FIG. 1.

Similar to the system shown in FIG. 2, the framer 401 of framing and transport unit 303 of the system shown in FIG. 3 provides signaling control of signaling information such as off-hook and ring detection. On the other hand, it can be seen from FIG. 4 that with the 16-bit codecs 304 in the Central Office Unit 301 (and similarly in the Customer Site Unit 302), the time slots with the given clock provided for the transmit data TX and receive data RX are effectively twice as that compared with the system shown in FIG. 2.

Figure 5:
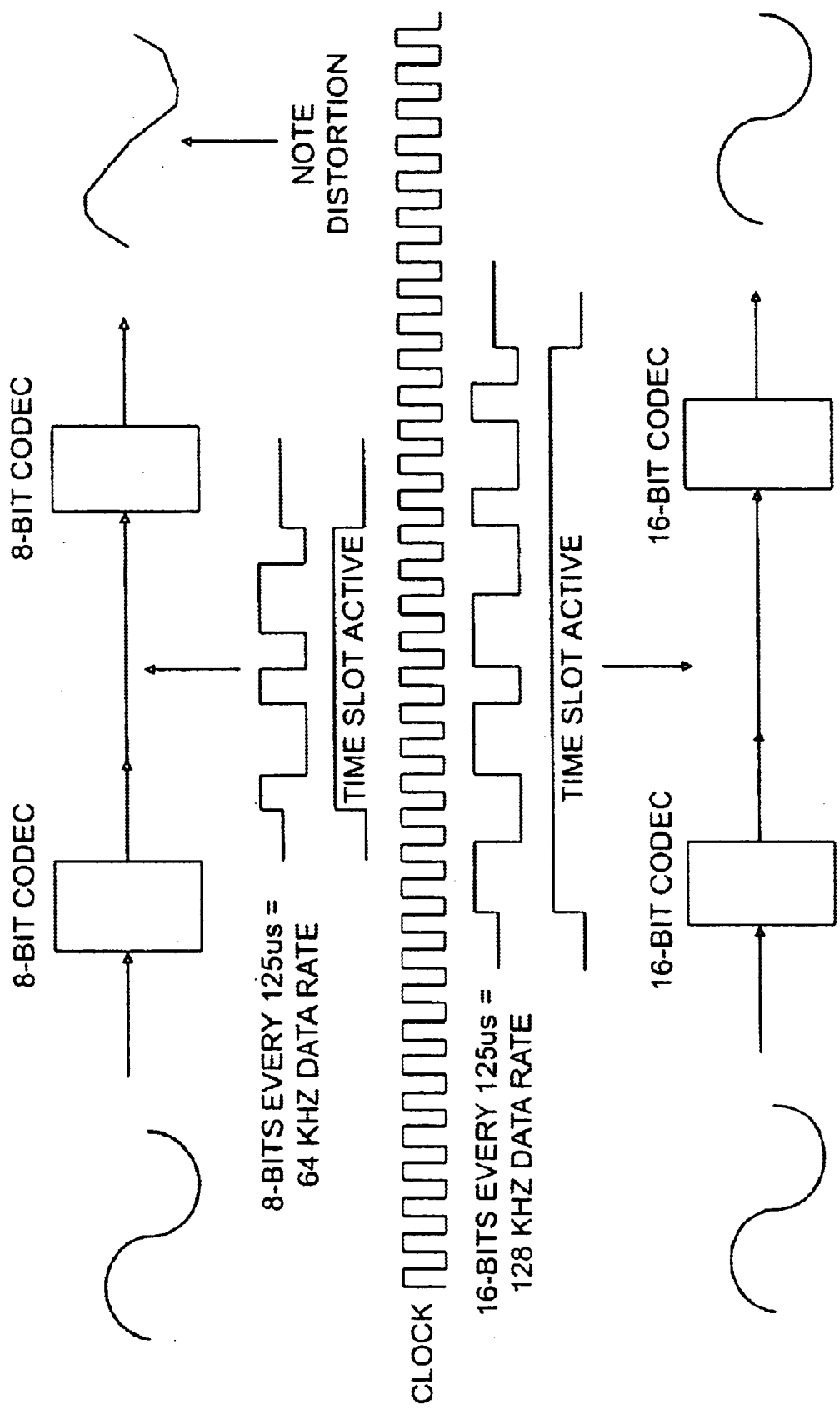
FIG. 5 illustrates a comparison between an 8-bit codec and a 16-bit codec.

FIG. 5 illustrates a comparison between the 8-bit and the 16-bit codecs of FIGS. 1 and 3, respectively. For example, a standard 8-bit codec sends eight bits of data stream every 125 microseconds for a data rate of 64 KHz per subscriber. By contrast, in the 16-bit conversion process, 16 bits of data is sent for every 125 microseconds for a data rate of 128 KHz per subscriber. This higher data rate forces the digital transmission line to run twice as fast to handle the same number of subscribers. Alternatively, the data rate can be maintained at the same level while the number of subscribers is reduced.

Multiple codecs are accommodated in a single data stream by assigning different time slots to the various different codecs. As discussed above, since the clock speed is a function of the number of codecs and the system resolution (i.e., the number of bits of the system), for an eight codec system with eight bits per subscriber, for example, 512 KHz would be required. With the same clock rate of 512 KHz, a four codec system with 16 bits per subscriber can be accommodated. This is illustrated in the time slots shown in FIG. 5 where the 16 bit codecs can be viewed as occupying two 8-bit codec time slots.

It can be seen from the above that in the case of the 8-bit conversion process, there are considerable distortion in the recovered analog signal waveform caused by the 8-bit conversion process. The advantage of the 16-bit system in accordance with one embodiment of the present invention is that the much less distortion is present in the recovered analog signal. The lower distortion in the recovered analog signal waveform translates into higher modem speeds when two modems are connected to communicate over the signal transmission system of the present application. Moreover, since the gain in the transmission speed is symmetrical, the 16-bit system in accordance with the present invention will improve modem transmission rates in either direction. Indeed, s discussed above, the present invention provides method and apparatus for transmitting encoded signals with increased data speed in communications system using high resolution analog to digital and digital to analog conversions to attain transmission rates higher than 33.6 Kb/s rate limit.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A high speed data transmission system, comprising:
   a data transmission line;
   a central office unit coupled to the data transmission line for receiving analog signals from a central office switch and for receiving digital signals from the data transmission line, the central office unit including:
      a plurality of subscriber line access circuits each configured to interface with a central office switch;
      a first plurality of codecs coupled to a respective one of the subscriber line access circuits, each of said first plurality of codecs configured to receive analog signals from the central office switch via the respective subscriber line access circuits and to convert the analog signals to corresponding digital signals wherein said first plurality of codecs includes eight 16-bit codecs;
      a first data bus coupled to each of the first plurality of codecs for transporting the digital signals; and
      a first controller coupled to the first data bus configured to receive the digital signals via the first data bus for transmission to the data transmission line; and
   a customer site unit coupled to the data transmission line for receiving analog signals from one or more subscriber terminals and for receiving digital signals from the transmission line, the customer site unit including:
      a plurality of subscriber line interface circuits each configured to interface with a one or more subscriber terminals;
      a second plurality of codecs coupled to a respective one of the plurality of subscriber line interface circuits to receive analog signals and to convert the analog signals to corresponding digital signals wherein the second plurality of codecs includes eight 16-bit codecs;
      a second data bus coupled to each of the second plurality of codecs for transporting the digital signals; and
      a second controller coupled to the second data bus configured to receive the digital signals from the second plurality of codecs via the data bus for transmission to the data transmission line.

2. The system of claim 1 wherein said data transmission line is a single twisted copper pair.

3. The system of claim 1 wherein the first and second data bus is a first and second bi-directional PCM data bus.

4. The system of claim 1 wherein said first controller includes a first framing and transport unit for packaging the digital signals received from the first plurality of codecs in accordance with a first clock signal for downstream transmission on the data transmission line, and further, wherein the second controller includes a second framing and transport unit for packaging the digital signals received from the second plurality of codecs in accordance with a second clock signal for upstream transmission on the data transmission line.

5. The system of claim 4 wherein the downstream data transmission for a single data stream is greater than 33.6 Kbps.

6. The system of claim 4 wherein the first and second clock signals are at a frequency of 512 Khz.

7. A central office unit, comprising:
   a plurality of subscriber line access circuits each configured to interface with a central office switch;
   a plurality of codecs coupled to a respective one of the plurality of subscriber line access circuits, each of said codecs configured to receive analog signals from the central office switch via the respective subscriber line access circuits and to convert the analog signals to corresponding digital signals 8 wherein said plurality of codecs includes eight 16-bit codecs;
   a data bus coupled to each of the codecs for transporting the digital signals; and
   a controller coupled to the data bus configured to receive the digital signals via the data bus for transmission to a transmission line.

8. The central office unit of claim 7 wherein the data bus is a bi-directional PCM data bus.

9. The central office unit of claim 7 wherein the transmission line is a single bi-directional twisted copper pair.

10. The central office unit of claim 7 wherein the controller includes:
    a framer coupled to the data bus for receiving the digital data from the data bus and packaging the digital data in accordance with a clock signal;
    a transceiver coupled to the framer configured to transport the packaged digital data to the transmission line; and
    a microprocessor coupled to the framer and the transceiver configured to provide control signals to the framer and transceiver.

11. The central office unit of claim 10 wherein the framer is configured to provide four 16-bit time slots for to transmit the digital data from the plurality of codecs in a single data stream.

12. The central office unit of claim 11 wherein the transmission rate of the transmission line for a single data stream is greater than 33.6 Kbps.

13. The central office unit of claim 7 wherein the controller is further configured to receive digital signals from the transmission line, and further, wherein each of the plurality of codecs are configured to receive a respective portion of the digital signals from the controller via the data bus for converting to corresponding analog signals.

14. The central office unit of claim 13 wherein the plurality of codecs are further configured to provide the converted analog signals to the respective subscriber line access circuits for transmission to the central office switch.

15. A customer site unit, comprising:
a plurality of subscriber line interface circuits each configured to interface with a one or more subscriber terminals;
a plurality of codecs coupled to a respective one of the plurality of subscriber line interface circuits to receive analog signals and to convert the analog signals to corresponding digital signals wherein said plurality of codecs includes eight 16-bit codecs;
a data bus coupled to each of the codecs for transporting the digital signals; and
a controller coupled to the data bus configured to receive the digital signals from the plurality of codecs via the data bus for transmission to a transmission line.

16. The customer site unit of claim 15 wherein the data bus is a bi-directional PCM data bus.

17. The customer site unit of claim 15 wherein the transmission line is a single bi-directional twisted copper pair.

18. The customer site unit of claim 17 wherein the controller includes:
a framer coupled to the data bus for receiving the digital data from the data bus and packaging the digital data in accordance with a clock signal;
a transceiver coupled to the framer configured to transport the packaged digital data to the transmission line; and
a microprocessor coupled to the framer and the transceiver configured to provide control signals to the framer and transceiver.

19. The customer site unit of claim 18 wherein the framer is configured to provide four 16-bit time slots for to transmit the digital data from the plurality of codecs in a single data stream.

20. The customer site unit of claim 15 wherein the controller is further configured to receive digital signals from the transmission line, and further, wherein each of the plurality of codecs are configured to receive a respective portion of the digital signals from the controller via the data bus for converting to corresponding analog signals.

21. The customer site unit of claim 20 wherein the plurality of codecs are further configured to provide the converted analog signals to the respective subscriber line interface circuits for transmission to the one or more subscriber terminals.

22. A high speed data transmission method, comprising the steps of:
providing a data transmission line;
installing a central office unit for connection to the data transmission line for receiving analog signals from a central office switch and for receiving digital signals from the data transmission line, the step of installing the central office unit including the steps of:
configuring a plurality of subscriber line access circuits for interface with a central office switch;
providing a first plurality of codecs coupled to a respective one of the subscriber line access circuits, each of said first plurality of codecs configured to receive analog signals from the central office switch via the respective subscriber line access circuits and to convert the analog signals to corresponding digital signals wherein the first plurality of codecs includes eight 16-bit codecs;
providing a first data bus coupled to each of the first plurality of codecs for transporting the digital signals; and
providing a first controller to the first data bus configured to receive the digital signals via the first data bus for transmission to the data transmission line; and
installing a customer site unit for connection to the data transmission line for receiving analog signals from one or more subscriber terminals and for receiving digital signals from the transmission line, the step of installing the customer site unit including the steps of:
configuring a plurality of subscriber line interface circuits for interface with a one or more subscriber terminals;
providing a second plurality of codecs coupled to a respective one of the plurality of subscriber line interface circuits to receive analog signals and to convert the analog signals to corresponding digital signals wherein the second plurality of codecs includes eight 16-bit codecs;
providing a second data bus coupled to each of the second plurality of codecs for transporting the digital signals; and
providing a second controller coupled to the second data bus configured to receive the digital signals from the second plurality of codecs via the data bus for transmission to the data transmission line.

23. The method of claim 22 wherein the step of providing the data transmission line includes the step of connecting the central office unit and the customer site unit to a single twisted copper pair.

24. The method of claim 22 wherein the first and second data bus is a first and second bi-directional PCM data bus.

25. The method of claim 22 wherein the step of providing the first controller includes the step of providing a first framing and transport unit for packaging the digital signals received from the first plurality of codecs in accordance with a first clock signal for downstream transmission on the data transmission line, and further, wherein step of providing the second controller includes the step of providing a second framing and transport unit for packaging the digital signals received from the second plurality of codecs in accordance with a second clock signal for upstream transmission on the data transmission line.

26. The method of claim 22 wherein the downstream data transmission for a single data stream is greater than 33.6 Kbps.

27. The method of claim 25 wherein the first and second clock signals are at a frequency of 512 Khz.

28. A method of installing a central office unit in a communication system, comprising the steps of:
providing a plurality of subscriber line access circuits each configured to interface with a central office switch;
providing a plurality of codecs coupled to a respective one of the plurality of subscriber line access circuits, each of said codecs configured to receive analog signals from the central office switch via the respective subscriber line access circuits and to convert the analog signals to corresponding digital signals wherein said plurality of codecs includes eight 16-bit codecs;
providing a data bus coupled to each of the codecs for transporting the digital signals; and
providing a controller coupled to the data bus configured to receive the digital signals via the data bus for transmission to a transmission line.

29. The method of claim 28 wherein the data bus is a bi-directional PCM data bus.

30. The method of claim 28 wherein the step of providing the controller includes the steps of:

providing a framer coupled to the data bus for receiving the digital data from the data bus and packaging the digital data in accordance with a clock signal;

providing a transceiver coupled to the framer configured to transport the packaged digital data to the transmission line; and providing a microprocessor coupled to the framer and the transceiver configured to provide control signals to the framer and transceiver.

31. The method of claim 30 wherein the step of providing the framer includes the step of providing four 16-bit time slots for to transmit the digital data from the plurality of codecs in a single data stream.

32. The method of claim 31 wherein the transmission rate of the transmission line for a single data stream is greater than 33.6 Kbps.

33. The method of claim 28 wherein the transmission line is a single bi-directional twisted copper pair.

34. The method of claim 28 wherein the step of providing the controller further includes the steps of receiving digital signals from the transmission line, and further, wherein the step of providing the plurality of codecs includes receiving a respective portion of the digital signals from the controller via the data bus for converting to corresponding analog signals.

35. The method of claim 34 wherein the step of providing the plurality of codecs further includes the step of transmitting the converted analog signals to the respective subscriber line access circuits.

36. A method of installing customer site unit in a communication system, comprising the steps of:

providing a plurality of subscriber line interface circuits each configured to interface with a one or more subscriber terminals;

providing a plurality of codecs coupled to a respective one of the plurality of subscriber line interface circuits to receive analog signals and to convert the analog signals to corresponding digital signals wherein said plurality of codecs includes eight 16-bit codecs;

providing a data bus coupled to each of the codecs for transporting the digital signals; and providing a controller coupled to the data bus configured to receive the digital signals from the plurality of codecs via the data bus for transmission to a transmission line.

37. The method of claim 36 wherein the data bus is a bi-directional PCM data bus.

38. The method of claim 36 wherein the transmission line is a single bi-directional twisted copper pair.

39. The method of claim 36 wherein the step of providing the controller includes the steps of:

providing a framer coupled to the data bus for receiving the digital data from the data bus and packaging the digital data in accordance with a clock signal;

providing a transceiver coupled to the framer configured to transport the packaged digital data to the transmission line; and providing a microprocessor coupled to the framer and the transceiver configured to provide control signals to the framer and transceiver.

40. The method of claim 39 wherein the step of providing the framer includes the step of providing four 16-bit time slots for to transmit the digital data from the plurality of codecs in a single data stream.

41. The method of claim 36 wherein the step of providing the controller further includes the step of receiving digital signals from the transmission line, and further, wherein the step of providing the plurality of codecs includes the step of receiving a respective portion of the digital signals from the controller via the data bus for converting to corresponding analog signals.

42. The method of claim 41 wherein the step of providing the plurality of codecs further includes the step of transmitting the converted analog signals to the respective subscriber line interface circuits.

* * * * *